(12) United States Patent
Oh

(10) Patent No.: US 10,846,500 B2
(45) Date of Patent: Nov. 24, 2020

(54) DISPLAY DEVICE WITH DISPLAY PANEL COMPRISING FORCE SENSOR AND FINGERPRINT SENSOR AND METHOD DRIVING THE DISPLAY DEVICE

(71) Applicant: LG DISPLAY CO., LTD., Seoul (KR)

(72) Inventor: Junseok Oh, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 166 days.

(21) Appl. No.: 16/112,038

(22) Filed: Aug. 24, 2018

(65) Prior Publication Data

US 2019/0130157 A1 May 2, 2019

(30) Foreign Application Priority Data

Oct. 30, 2017 (KR) ........................ 10-2017-0142421

(51) Int. Cl.
| | |
|---|---|
| *G06K 9/20* | (2006.01) |
| *G06K 9/00* | (2006.01) |
| *G06F 1/3234* | (2019.01) |
| *G06F 1/3231* | (2019.01) |
| *G06F 1/16* | (2006.01) |

(52) U.S. Cl.
CPC ....... *G06K 9/00013* (2013.01); *G06F 1/1626* (2013.01); *G06F 1/1637* (2013.01); *G06F 1/1684* (2013.01); *G06F 1/3231* (2013.01); *G06F 1/3265* (2013.01); *G06K 9/00993* (2013.01)

(58) Field of Classification Search
CPC ....................................... G06K 9/00006–0012
See application file for complete search history.

(56) References Cited

U.S. PATENT DOCUMENTS

| | | | |
|---|---|---|---|
| 2018/0321780 A1* | 11/2018 | Park | .............. G06K 9/0002 |
| 2018/0329560 A1* | 11/2018 | Kim | ............... G06K 9/00006 |
| 2020/0082150 A1* | 3/2020 | Lee | ............... G06K 9/00912 |

\* cited by examiner

*Primary Examiner* — Brian Werner
(74) *Attorney, Agent, or Firm* — Birch Stewart Kolasch & Birch, LLP

(57) ABSTRACT

A display device can include a display panel configured to display an image; a fingerprint sensor disposed on a rear surface corresponding to an image display area of the display panel; one or more force sensors disposed at a periphery of the fingerprint sensor or on a rear surface of the fingerprint sensor; a fingerprint sensing processor configured to control the fingerprint sensor and the one or more force sensors, and in response to the one or more force sensors sensing a force transmitted through an upper side of the display panel, activate fingerprint sensing of the fingerprint sensor; and an application processor configured to control an application and transmit an image signal to the display panel to display an object at an area in the image display area corresponding to a position of the fingerprint sensor.

18 Claims, 14 Drawing Sheets

DISPLAY DEVICE WITH DISPLAY PANEL COMPRISING FORCE SENSOR AND FINGERPRINT SENSOR AND METHOD DRIVING THE DISPLAY DEVICE

CROSS-REFERENCE TO RELATED APPLICATION

This application claims priority to and the benefit of Korean Patent Application No. 10-2017-0142421, filed in the Republic of Korea on Oct. 30, 2017, the entirety of which is incorporated herein by reference.

BACKGROUND

1. Field of the Invention

The present invention relates to a display with a display panel comprising a force sensor and a fingerprint sensor and a method of driving the same.

2. Description of Related Art

A display (or a display device) is a device which visually displays data, and includes a Liquid Crystal Display device, an Electrophoretic Display, an Organic Light Emitting Display, an inorganic Electro Luminescent (EL) Display, a Field Emission Display, a Surface-conduction Electron-emitter Display, a Plasma Display, or a Cathode Ray Display, etc.

A display panel may be coupled with a predetermined interface module to receive various information from the outside. In an embodiment of the present invention, a module to receive a touch input can be arranged within the display panel or outside the display panel.

In particular, a display panel coupled to various devices has been proposed to enhance security by using fingerprints of the finger with increasing tendency to display personal information related to an individual's privacy or important data requiring confidentiality.

In particular, as a display panel and a fingerprint sensor to sense a fingerprint of a finger are combined to provide a technique of sensing the fingerprint on the display panel, in order to increase a sensing speed of the fingerprint or to eliminate an erroneous sensing result, it is necessary to adjust an operation process of the display panel or to construct an additional sensor.

SUMMARY OF THE INVENTION

The present invention proposes a device and a method for improving speed and/or accuracy of fingerprint sensing on a display panel.

The present invention proposes a device and a method for improving battery performance by reducing an amount of power consumption during a fingerprint sensing process.

The objects of the present invention are not limited to the above-mentioned objects and other objects and advantages of the present invention which are not mentioned can be understood by the following description and will be more clearly understood by embodiments of the present invention. Further, it will be readily seen that the objects and the advantages of the present invention can be realized by means indicated in claims and the combination thereof.

In accordance with an example embodiment of the present invention, a display includes a display panel, a fingerprint sensor arranged on a rear surface of the display panel, and one or more force sensors arranged on a periphery of the fingerprint sensor or on a rear surface of the fingerprint sensor.

In accordance with an embodiment of the present invention, a display includes a fingerprint sensing processor to control the fingerprint sensor and the force sensor and control a fingerprint sensing of the fingerprint sensor when the force sensor senses a force transmitted through the upper surface.

In accordance with another aspect of the present invention, the display includes a fingerprint sensing processor to generate fingerprint input information corresponding to the fingerprint sensing of the fingerprint sensor and transmit produced fingerprint input information to an application processor.

In accordance with an embodiment of the present invention, a method for driving a display includes generating force input information by a fingerprint sensing processor of a display, by using information sensed by a force sensor arranged adjacent to a fingerprint sensor disposed on a rear surface of a display panel and controlling the fingerprint sensor by the fingerprint sensing processor in response to force input information.

In accordance with an embodiment of the present invention, the method for driving the display includes generating fingerprint input information corresponding to a fingerprint sensing sensed by the fingerprint sensor, by the fingerprint sensing processor and transmitting fingerprint input information to an application processor to control an application of the display by the fingerprint sensing processor.

When the present invention is applied, since the fingerprint sensing processor of the display can control a time point at which a driving of the fingerprint sensor is needed in response to a force sensing result of the force sensor, the fingerprint sensing processor can activate the fingerprint sensing without other sensing processor and increase the speed of the fingerprint sensing and reduce power consumption due to the above.

In addition, the present invention is applied, since the display can perform the fingerprint sensing based on the force that is applied or driven to a specific part of the fingerprint sensor or a specific part adjacent to the fingerprint part, the accuracy of the fingerprint sensing can be increased.

In addition, the present invention is applied, in driving a specific application by using a directionality or a position of the force sensed by the force sensor, the display can prevent an unnecessary page from being accessed and reduce an input of a user to increase a user convenience.

The effects of the present invention are not limited to the effects described above, and those skilled in the art of the present invention can derive various effects of the present invention in a constitution of the present invention.

DETAILED DESCRIPTION OF EMBODIMENTS

Figure 1:
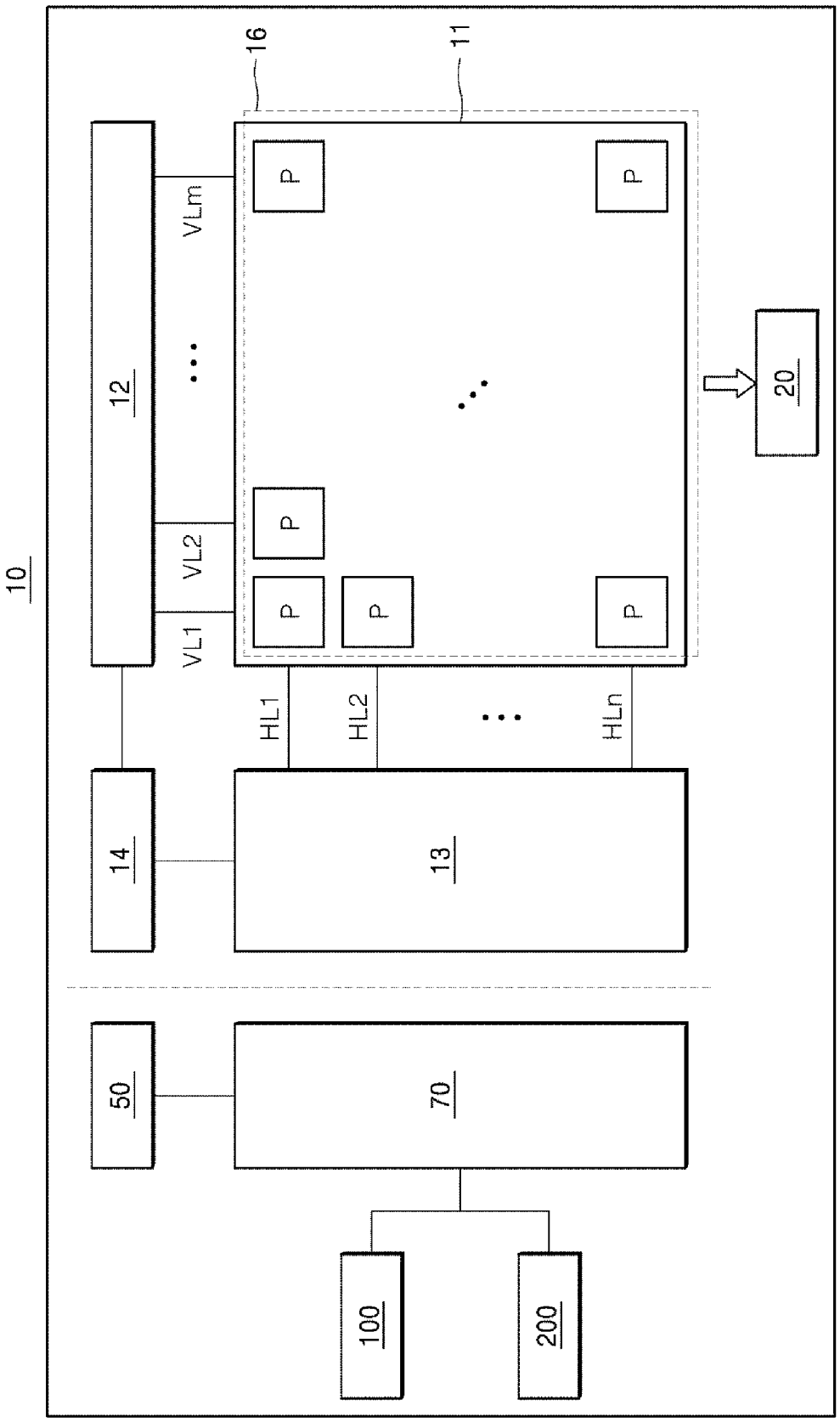
FIG. 1 is a view illustrating a display in accordance with an embodiment of the present invention.

Hereinafter, the embodiments of the present invention will be described in detail with reference to the drawings so that those skilled in the art can easily perform the present invention. The present invention can be embodied in many different forms and is not limited to the embodiments described herein.

In order to clearly describe the present invention, the part that is not related to the description is omitted, and the same reference numeral is used for the same or similar component throughout the specification. Further, some embodiments of the present invention will be described in detail with reference to drawings. In adding the reference numeral to the components of each drawing, the same components may have the same reference numeral as possible even if the components are displayed on the different drawing. In addition, in describing the present invention, when a specific description of the related known constitution or a function is determined to obscure the gist of the present invention, the detailed description thereof can be omitted.

Hereinafter, the feature that any configuration is provided or arranged on an upper part (or a lower part)" of a base material or "on (or under)" of a base material means that any configuration is provided or arranged in contact with the upper surface (or the lower surface) of the base material, and is not limited to the feature that the other configuration is not included between the base material and any configuration which is provided or arranged on (or under) the base material. In addition, in describing the component of the present invention, the terms such as a first, a second, A, B, (a), (b), etc. can be used. These terms are only intended to distinguish the component from other component, and the nature, the order, the sequence, or the number of the corresponding component are not limited by the terms. When any component is described as being "linked," "coupled," or "connected" to other component, it will have to be understood that the component may be directly linked or connected to other component, whereas other component is 'interposed' between each component, or each component can be "linked," "coupled" or "connected" through other component.

A display externally outputs image data provided from outside using various light sources. In this process, image data is divided into red (R), green (G) and blue (B) to be provided to the display, and may optionally include white (W) or Black (black).

In addition, the display of the present invention can be combined with a display panel, a fingerprint sensor, and a force sensor. It will be described in FIG. 1 in detail.

FIG. 1 is a schematic view illustrating a display in accordance with an embodiment of the present invention. The present invention can be applied to various types of displays, such as an Organic Light Emitting Display, a Liquid Crystal Display, and the like.

Referring to FIG. 1, the display 10 in accordance with the embodiments of the present invention includes a display panel 11 in which a plurality of first lines VL1 to VLm are formed in a first direction (e.g., a vertical direction) and a plurality of second lines HL1 to HLn are formed in a second direction (e.g., a horizontal direction), a first driving part to supply a first signal to the plurality of first lines VL1 to VLm, and a second driving part 13 to supply a second signal to the plurality of second lines HL1 to HLn, and a timing controller 14 to control the first driving part 12 and the second driving part 13.

A display panel 11 displays an image and a plurality of pixels (P) are defined according to an intersection of a plurality of first lines VL1 to VLm which is formed in a first direction (e.g., a vertical direction) and a plurality of a second lines HL1 to HLn which are formed in a second direction (e.g., a horizontal direction).

Each of the above-mentioned first driving part 12 and the second driving part 13 can include at least one Driver IC to output a signal for displaying an image. The first driving part 12 includes one or a plurality of data drivers or source drivers Integrated Circuit (IC). The second driving part 13 includes one or a plurality of gate drivers.

In one example, the plurality of first lines VL1 to VLm formed in the first direction on the display panel 11 are formed in the vertical direction (the first direction) and can be a data line to transmit a data voltage (the first signal) to a pixel column in a vertical direction and the first driving part 120 can be a data driving part to supply a data voltage to a data line.

In addition, the plurality of second lines HL1 to HLm formed in the second direction on the display panel 11 are formed in the horizontal direction (the second direction) and can be a gate line to transmit a scan signal (a first signal) to a pixel column in a vertical direction and the second driving part 120 can be a gate driving part to supply a scan signal to a data line.

In addition, a pad part is formed on the display panel 11 to connect the first driving part 12 and the second driving part 13. When the first signal is supplied to the plurality of first lines VL1 to VLm from the first driving part 12, it is transmitted to the display panel 11. Likewise, the second signal is supplied to the plurality of second lines HL1 to HLn in the second driving part 13 and it is transmitted to the display panel 11.

Each pixel can include one or more subpixels or each pixel can indicate each of these subpixels. The subpixel refers a unit in which a specific kind of color filter is formed, or an organic light emitting element emits a particular color without the color filter being formed. Red (R), Green (G), Blue (B), and optionally White (W) can be included as a color defined in the subpixel, but the present invention is not limited thereto. Each subpixel includes separate thin film transistor and an electrode connected thereto. Hereinafter, the subpixel forming the pixel is also referred to as a pixel area. In addition, an electrode to control a light emitting of each pixel area is referred to as a pixel electrode.

An electrode connected to a thin film transistor to control a light emission of each pixel area of a display panel is referred to as a first electrode and an electrode arranged on an entire surface of the display panel or arranged to include two or more pixel areas is referred to as a second electrode. When the first electrode is an anode electrode, the second electrode is a cathode electrode, and vice versa. Hereinafter, the anode electrode will be described as one embodiment of the first electrode, and the cathode electrode will be described as an example of the second electrode, but the present invention is not limited thereto.

In addition, the display panel 11 can optionally include a touch panel 16 to sense an external touch input. The display panel 11 can be implemented by an in-cell touch method in which the display panel 11 and the touch panel 16 are integrally coupled. Accordingly, in embodiments of the present invention, the touch panel 16 does not exist separately and can include a function of recognizing a touch among the functions provided by the display panel 11. The touch panel 16 can be referred to as an integrated touch panel to the display panel 11 and a touch IC 20 senses a touch input signal in which the display panel 11 or separate touch panel 16 senses, which is realized by the in-cell touch method.

In addition, in accordance with an embodiment of the present invention, in FIG. 1, the display 10 can be a mobile phone, a smart phone, a notebook, and the like. The display 10 can include an application processor (AP) to control the operations of the mobile phone, the a smart phone, and the notebook, or an application installed therein, a fingerprint sensor 100 which is arranged on a rear surface of the display panel and performs a fingerprint recognition, a force sensor 200 to sense a force, such as a pressure, and a fingerprint sensing processor (FPIC, Fingerprint IC) 70 for a fingerprint recognition. The force includes a physical pressure caused by a touch or a contact, or a force which causes a change in an electrical signal.

Therefore, in FIG. 1, the display 10 can be logically divided into an area (a host area) having the application processor 50, the fingerprint sensor 100, the force sensor 200 and the fingerprint sensing processor 70, and an area (an image area) of the display panel 11 and the components 12, 13, and 14 which are used for outputting an image signal to the display panel.

The force sensor 200 can be arranged on a periphery of the fingerprint sensor 100 or on a rear surface of the fingerprint sensor 100. In an embodiment of the present invention, the force sensor 200 can comprise a plurality of force electrodes that generate an electrical signal to the pressure. In the present specification, the force sensor 200 is a logical component that includes one or more force electrodes. The fingerprint sensing processor 70 controls the fingerprint sensor 100 and the force sensor 200 to controls a fingerprint sensing of the fingerprint sensor 100 when the force sensor 200 senses the force transmitted through the upper surface of the display panel 11. As a result, since a time point or a time period used for a driving of the fingerprint sensor 100 can be controlled in response to a force sensing result of the force sensor, it is possible to selectively activate the fingerprint sensing only with the fingerprint sensing processor 70.

This enables a generation of fast fingerprint input information. At the same time, based on the force sensor, the fingerprint sensing processor 70 can accurately confirm whether the fingerprint is pressed by the fingerprint recognition or simply touched by the force sensor to improve an accuracy of the fingerprint sensing.

In particular, in a mode (Always On Display (AOD)) in which an image is always output on the entire surface of the display panel 11, it is possible to maintain a fingerprint recognition preparation state such that is corresponds to the fingerprint recognition in order to wake up the display 10 or execute a previously appointed application. However, in order to maintain the fingerprint recognition preparation state, a lot of power consumption is required to detect the touch on the touch panel. This will be described in FIGS. 6 and 7.

Figure 2:
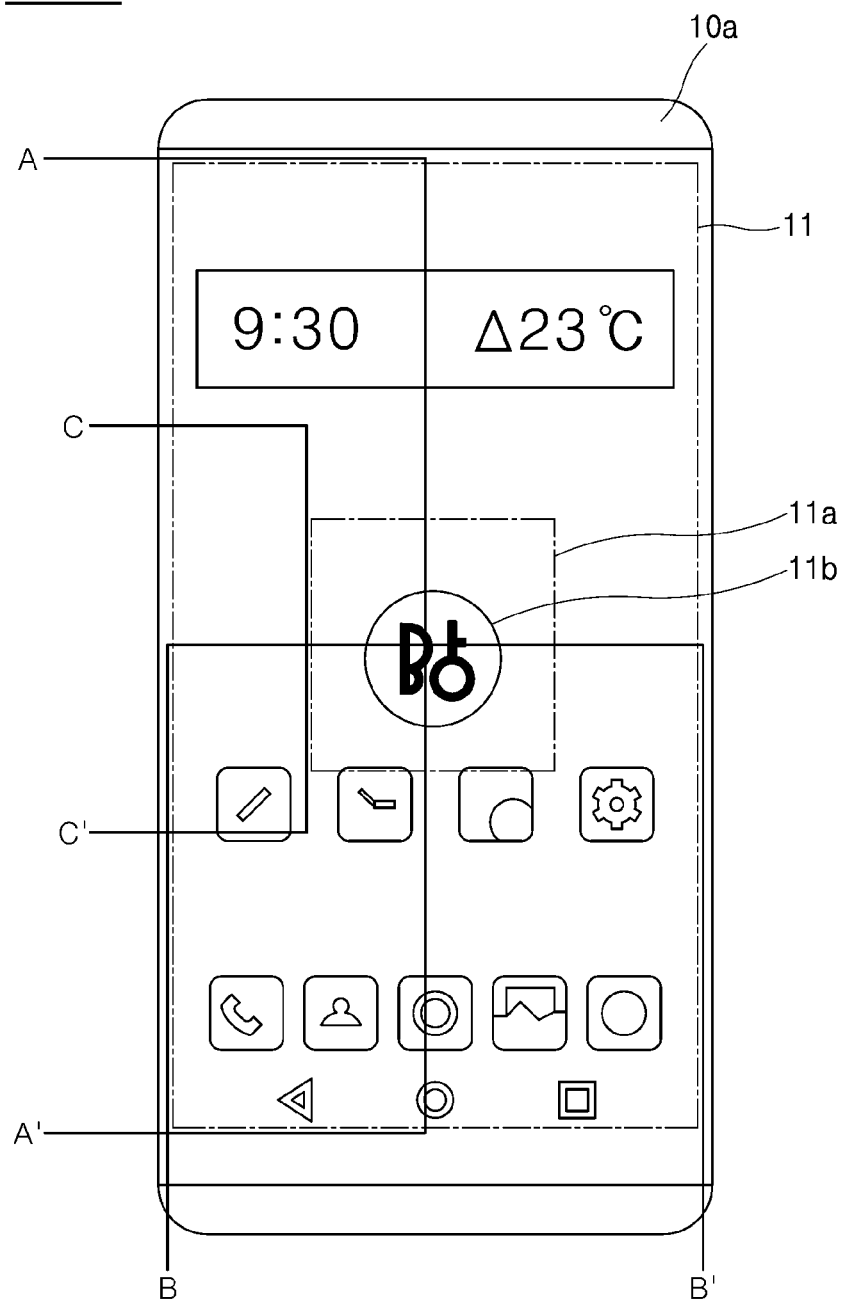
FIG. 2 is a view illustrating a configuration of a smart phone as an example embodiment of a display in accordance with an embodiment of the present invention.

FIG. 2 is a view illustrating a configuration that an embodiment of the present invention of a display is a smart phone in accordance with an embodiment of the present invention. A middle area 11a of the display panel 11 included in a display 10a having a smart phone as an embodiment of the present invention is an area in which a fingerprint sensor is disposed. An application processor 50 can drive an image signal to the display panel 11 such that a position, in which the fingerprint sensor 100 is arranged, is displayed on the display panel 11 in order to input a fingerprint accurately to the fingerprint sensor by a user.

A part which is roundly indicated as 11b in middle area 11a helps the user confirm a position of the fingerprint sensor visually. An accuracy of a fingerprint sensing can be enhanced by applying the image signal by the application processor 50 so that a specific sign or mark is displayed on the position of the fingerprint sensor of the display panel 11. In particular, in an AOD mode, since the user can always perform the fingerprint sensing without any input, a speed of the fingerprint sensing can be increased. Therefore, in accordance with an embodiment of the present invention of part 11b is an image display area which displays the positions of the fingerprint sensor 100 and the force sensor 200 arranged on a rear surface of the display panel 11. As a result, the image signal can be applied to the image display area of the display panel 11 such that the position where the fingerprint sensor 100 is arranged is displayed on the display panel 11. An embodiment of the present invention is to drive the image signal such that an area which can guide a touch is displayed during fingerprint recognition only in some area of the display panel 11. In addition, the fingerprint sensor 100 and the force sensor 200 are disposed on a rear surface in the image display area 11b of the display panel 11. In other words, in accordance with an embodiment of the present invention, the fingerprint sensor 100 and the force sensor 200 are arranged on the rear surface of the display panel 11 corresponding to the image display area of the display area 11 or the fingerprint sensor 100 is arranged on the rear surface of the display panel 11 corresponding to the image display area.

The position of the fingerprint sensor can be arranged at various positions in the display panel according to the size or the feature of the display. Also, in embodiments of the present invention, a separate force sensor is arranged on the area adjacent to the fingerprint sensor or different from the fingerprint sensor in order to increase the speed of the fingerprint sensing and lower a possibility of a misoperation or erroneous input. In FIG. 2, the display panel 11 and the components arranged on the lower part thereof with reference to a cross section of A-A', a cross section of B-B', and a cross section of C-C' is described as in FIG. 3.

Figure 3:
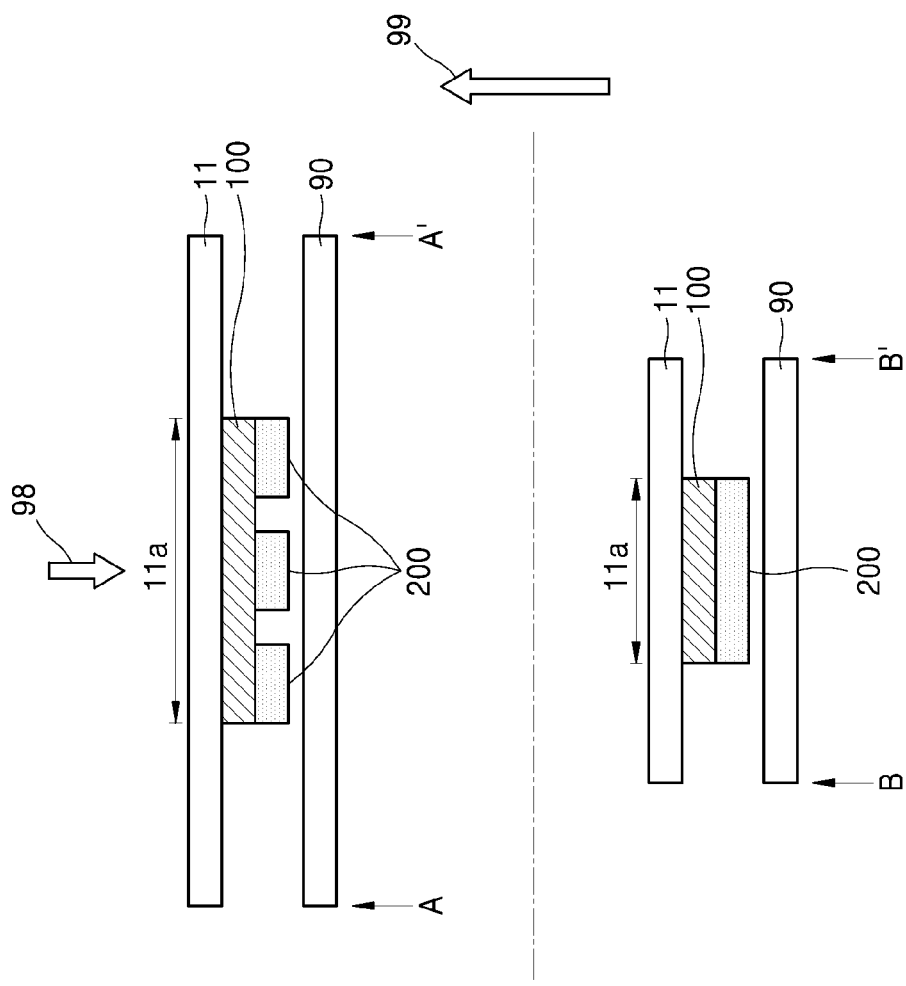
FIG. 3 is a view illustrating a configuration in which a finger sensor and a force sensor are arranged in different layers on a display panel in accordance with an embodiment of the present invention.

FIG. 3 is a view illustrating a configuration in which a fingerprint sensor and a force sensor are arranged in different layers in or on a display panel in accordance with an embodiment of the present invention.

The fingerprint sensor 100 is arranged under the display panel 11. In addition, the force sensor 200 is arranged on a rear surface of the fingerprint sensor 100. It can be determined whether the fingerprint sensor 100 is in a state in which fingerprint recognition is required by using a force directionality detected by the force sensor 200. It can be confirmed that the fingerprint sensor 100 is arranged corresponding to a middle area 11a for a fingerprint recognition. In FIG. 3, in cross section A-A' and cross section C-C', there is no different part in an arrangement of the fingerprint sensor 100 and the force sensor 200.

FIG. 3 shows a configuration in which the fingerprint sensor 100 is arranged on the rear surface of the display panel 11 and the force sensor 200 is arranged on the rear surface of the fingerprint sensor 100. Here, the fingerprint sensing processor 70 controls the fingerprint sensor 100 according to a direction of the force sensed by the force sensor 200 or a position of the sensed force sensor 200 corresponding to a force applied or driven on an upper surface in a direction 98.

In a stacked structure, as shown in FIG. 3, it can be confirmed whether a force is applied or driven to a specific part of the fingerprint sensor. For example, in a state which central "1" force sensor does not detect a force in 81a, 81b, 82a, 82b, 83a and 83b of FIG. 8 corresponding to FIG. 3, when the force sensor in "2", "3", "4", and "5" detects the force, the fingerprint sensing processor 70 can confirm that it is not in a fingerprint input state and can enhance a speed or an accuracy of the fingerprint recognition.

Figure 4:
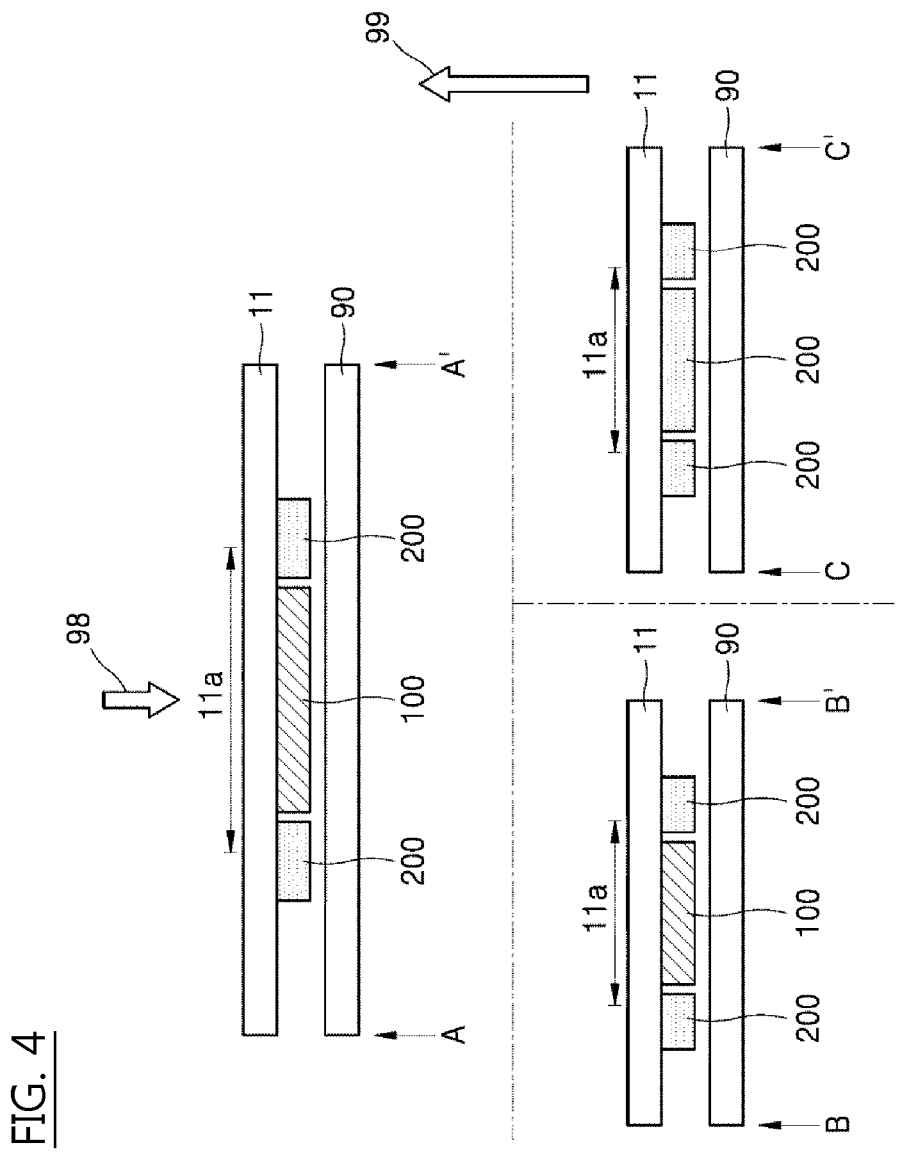
FIG. 4 is a view illustrating a configuration in which a finger sensor and a force sensor are arranged in the same layer on a display panel in accordance with another embodiment of the present invention.

FIG. 4 is a view illustrating a configuration in which a fingerprint sensor in accordance with an embodiment of the present invention is arranged in the same layer on a display panel. In this instance, the force sensor 200 can be formed of surrounding a periphery of the fingerprint sensor 100. It is possible to confirm whether a contact is made with the fingerprint sensor 100 by using an ambient force sensor 200. It can be confirmed that the fingerprint sensor 100 is arranged corresponding to a middle area 11a for a fingerprint recognition.

In FIG. 4, there is a different arrangement of the fingerprint sensor 100 and the force sensor 200 in cross section A-A' and cross section C-C'. This is because it can be confirmed that cross section A-A' is a center part of the fingerprint recognition area, so that the fingerprint sensor 100 is arranged and the force sensor 200 is arranged on the upper and lower boundaries of the fingerprint sensor 100. On the contrary, since cross section C-C' is a boundary part of the fingerprint recognition area, it can be seen that the force sensor 200 is arranged without the fingerprint sensor 100 being arranged in this area.

FIG. 4 shows a configuration in which the fingerprint sensor 100 and the force sensor 200 are arranged on a rear surface of the display panel 11 and the force sensor 200 is arranged on a side surface of the fingerprint sensor 100. Here, a fingerprint sensing processor 70 controls the fingerprint sensor 100 according to a direction of the force sensed by the force sensor 200 or a position of the sensed force sensor corresponding to a force which is applied or driven on an upper surface of the display panel 11 in a direction 98.

In a stacked structure as shown in FIG. 4, it can be confirmed whether the force is applied or driven to a part adjacent to the fingerprint sensor. For example, the force sensor arranged at a specific side surface in 91, 92, 93, and 94 in FIG. 9 can detect the force, and particularly when each force sensor is based on a time difference sensed by the force, the direction of the force can be confirmed. The fingerprint sensing processor 70 can confirm it based on the position or direction of the identified force and can increase a speed or an accuracy of the fingerprint recognition and provide sensed force input information to an application processor 50 to execute a corresponding application.

As shown in FIGS. 3 and 4, the force sensor 200 and the fingerprint sensor 100 can be overlapped on the rear surface of the display panel 11 or in the same layer. Alternatively, the force sensor 200 of FIGS. 3 and 4 can be arranged on one display panel 11. For example, a force sensor can be arranged on the rear surface of the fingerprint sensor 100, and a force sensor can be arranged on the side surface of the fingerprint sensor 100 to enhance a sensing accuracy of the force.

In addition, a touch panel is not shown in FIGS. 3 and 4. The touch panel is included in the display panel 11, or the touch panel is arranged on the display panel 11, or the touch panel can be arranged between the display panel 11 and the fingerprint sensor 100. Alternatively, the touch panel is not limited thereto and can be arranged in various ways.

In order for the fingerprint sensor to recognize the fingerprint, it is necessary to confirm whether it is a fingerprint recognition state or not according to an embodiment. For example, according to an embodiment, it is necessary to confirm that the finger is a touched state for the fingerprint recognition in the area 11a previously shown in FIG. 2 to FIG. 4. For this, an embodiment of the present invention will be described with regard to a method of confirming that it is in a touched state by using the force sensor or a method of confirming that it is in a touched state of the touch panel. The fingerprint sensing processor 70 is capable of driving the force sensor and can confirm a situation of the fingerprint recognition by using a sensed value of the force sensor.

Figure 5:
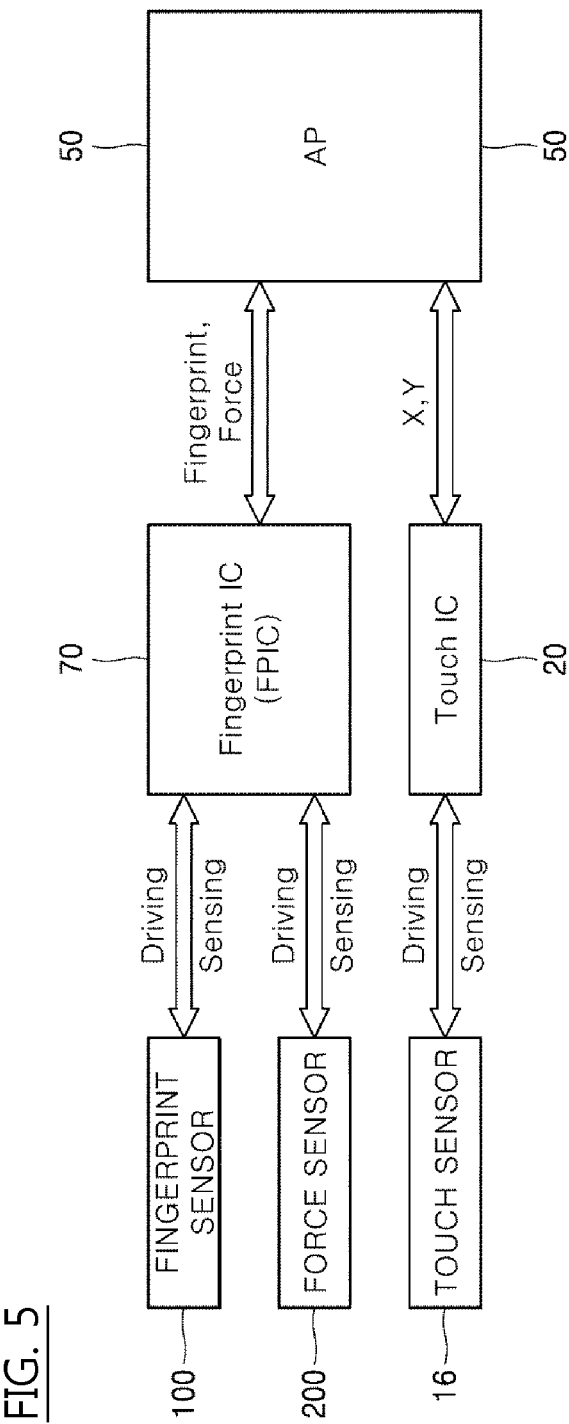
FIG. 5 is a view illustrating an operation between each sensor and a processor in accordance with an embodiment of the present invention.

FIG. 5 is a view illustrating an operation between respective sensors and a processor in accordance with an embodiment of the present invention.

A fingerprint sensing processor 70 drives a driving signal and a fingerprint sensor 100 senses a fingerprint. Likewise, the fingerprint sensing processor 70 drives a driving signal to a force sensor and senses a pressure which is applied or driven to a force sensor. A communication between the fingerprint sensing processor 70 and an application processor 50 can be communicated in a Serial Peripheral Interface (SPI) bus method, but the present invention is not limited thereto.

In addition, a touch IC 20 also drives a driving signal to the touch sensors on a touch panel 16 and senses a touched position. A communication between the touch IC 20 and the application processor 50 can be communicated in an Inter-Integrated Circuit (I2C) method, but the present invention is not limited thereto. As a result, the application processor 50 receives fingerprint information and force information from the fingerprint sensing processor 70 and a coordinate X, Y touched from the touch IC 20.

In the configuration of FIG. 5, the fingerprint sensor 100 and the force sensor 200 can transmit and receive a rapid signal through one processor (FPIC). Further, a signal can be transmitted and received between the fingerprint sensor 100 and the touch panel 16 through the application processor 50. This will be described in more detail.

Figure 6:
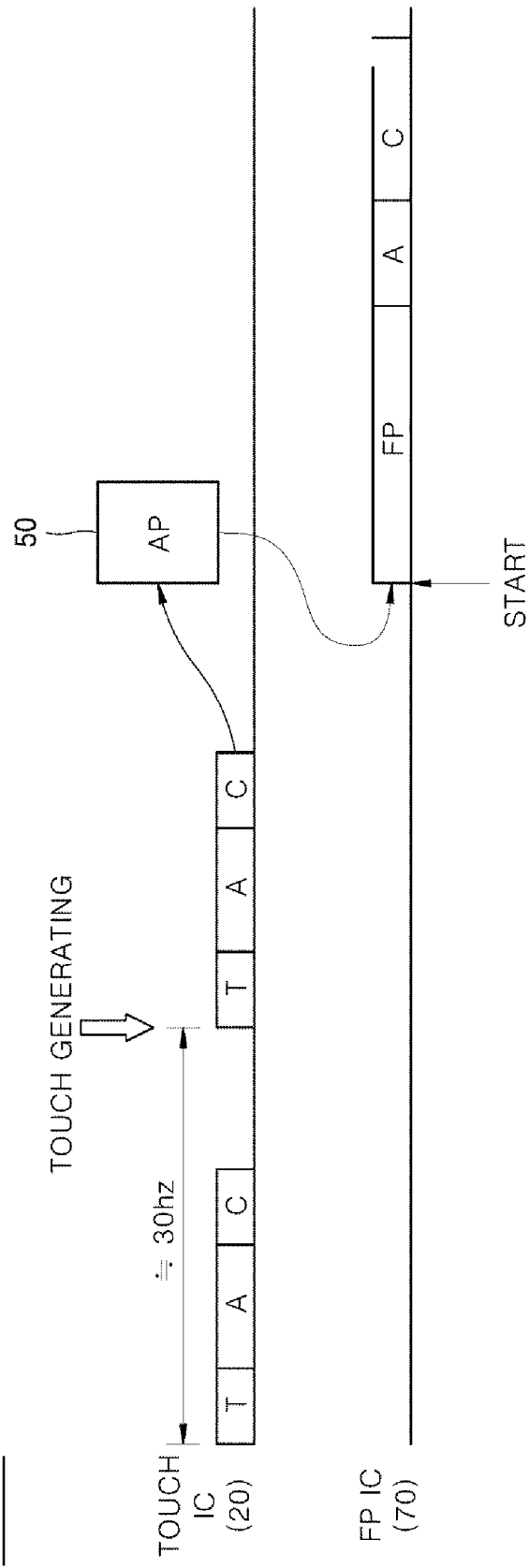
FIG. 6 is a view illustrating a process of activating a fingerprint sensor by a sensing of a touch sensor in accordance with an embodiment of the present invention.

FIG. 6 is a view illustrating a process of activating a fingerprint sensor by sensing a touch sensor.

A touch IC 20 senses a touch according to a cycle including a touch section T (e.g., a time period allocated for sensing touch), an algorithm section A (e.g., a time period allocated for algorithm execution/processing), and a communication section C (e.g., a time period allocated for communicating/transmitting information). The algorithm section A analyzes a signal of a point in which the touch is generated to calculate x, y values of a touched point.

In an embodiment of the present invention, the process can repeat according to a 30 Hz cycle. As shown in FIG. 6, when a touch is generated according to a driving of T section, that is, when the touch is sensed, the touch IC 20 calculates a touched position and transmits calculated position information to an application processor 50 and notifies that a touch has occurred. At this time, the application processor 50 can confirm whether a touch-detected area (x, y information) is an area 11a which performs fingerprint recognition and confirm that a touch is generated at that region.

When a touch is generated in a fingerprint recognition area 11a, the application processor 50 can instruct a fingerprint sensing processor 70 to control the fingerprint sensor an implementation of an operation for the fingerprint recognition (a driving of a driving signal). In a point indicated by "START" in FIG. 6, the fingerprint sensing processor 70 can be operated according to a section to perform the fingerprint recognition FP, a section to activate the fingerprint recognition A, a communication section C to notify the application processor 50 to the fingerprint-recognized result.

However, when the touch IC 20 is continuously operated for touch sensing, a driving power required for touch sensing is consumed. In addition, since the start of the fingerprint recognition is instructed from the touch IC 20 to the fingerprint sensing processor 70 via the application processor 50, a signal transmission delay may occur between each processor. In other words, in this situation, the fingerprint sensor has to wait to be activated by the application processor 50 after the application processor 50 receives the appropriate signal from the touch sensor and touch IC 20. Therefore, in order to deal with it rapidly, the embodiments of the present invention use a force sensor.

Figure 7:
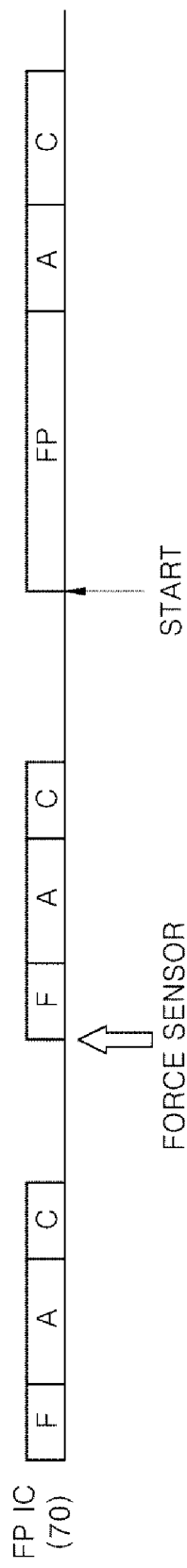
FIG. 7 is a view illustrating a process of activating a fingerprint sensor by a sensing of a force sensor in accordance with an embodiment of the present invention.

FIG. 7 is a view illustrating a process of activating a fingerprint sensor by sensing a force sensor in accordance with an embodiment of the present invention. The force sensor 200 is arranged adjacent to the fingerprint sensor 100 as shown in FIG. 3 or FIG. 4.

A touch IC 20 is in a non-operating state. Alternatively, the touch IC 20 operates but is in a state which performs an additional action with regard to a touch of a fingerprint recognition area. In this state, the fingerprint sensing processor 70 is operated according to a section F to sense the force input, an algorithm section A to calculate a position and a size of a sensed force, and a communication section C to notify the application processor of the calculated result.

In this process, as shown in FIG. 7, when it is confirmed that the force input is generated, the fingerprint sensing processor 70 is operated in a point indicated by "START" according to a section FP to perform a fingerprint recognition, an algorithm section A to perform calculating a recognized fingerprint, and a communication section C to notify fingerprint-recognized result to the application processor 50.

In FIG. 7, since the fingerprint sensing processor 70 can start the fingerprint recognition according to a sensing result of the force sensor without an operation of the touch IC 20, it is possible to start the fingerprint recognition in a more rapid time. In other words, the fingerprint sensor only has to wait to by turned on by the force sensor, thus avoiding the delay of having to wait for the touch sensor, the touch IC 20 and the application processor 50 to collectively decide when to turn on the fingerprint sensor. In addition, driving the force sensor has a lower power consumption amount than driving the touch panel, and thus, it is more efficient.

Figure 8:
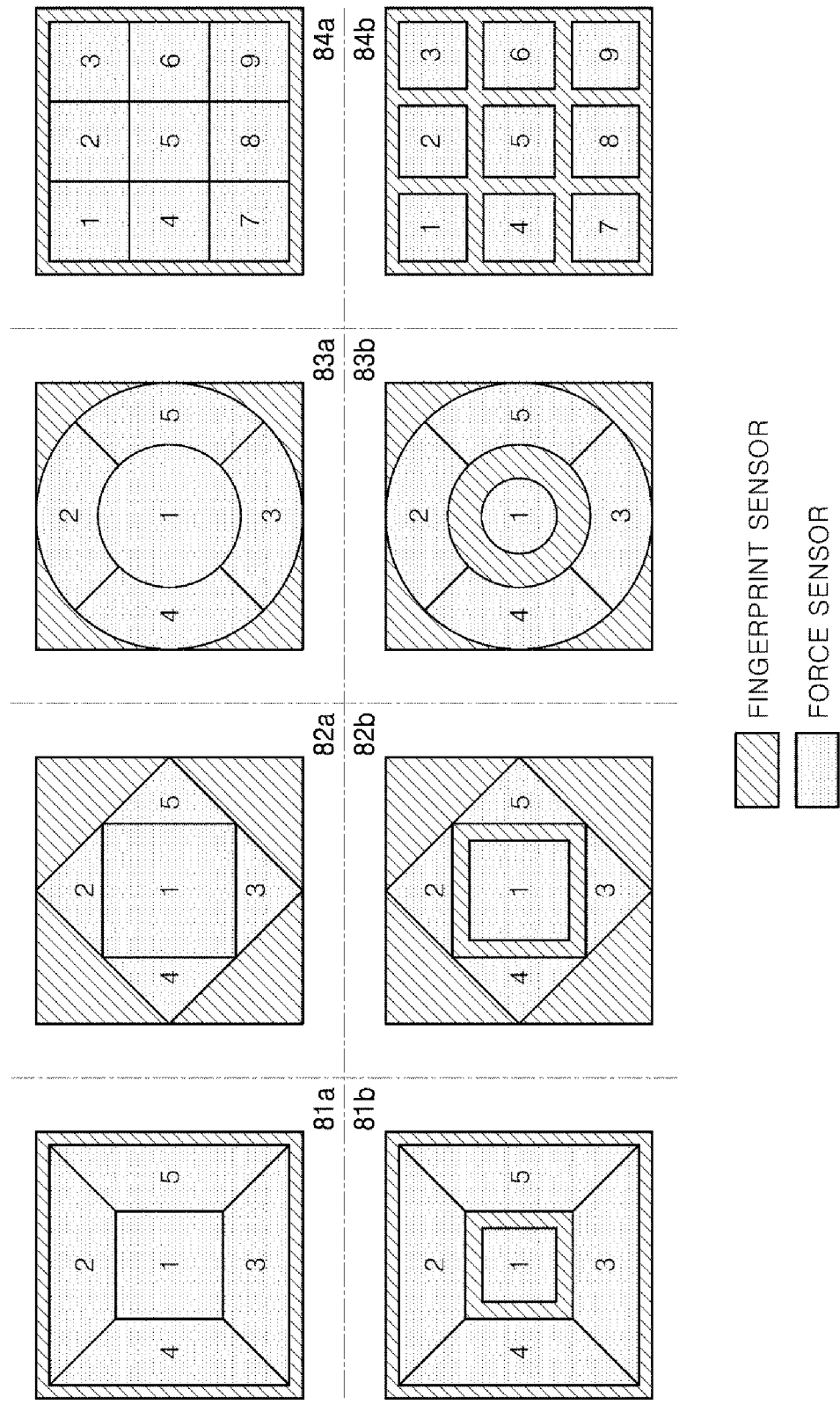
FIG. 8 is a view illustrating an embodiment in which a force sensor can be formed in a structure in which a fingerprint sensor and a force sensor are stacked as shown in FIG. 3 in accordance with an embodiment of the present invention.

FIG. 8 is a view illustrating an embodiment in which a force sensor can be formed in a structure in which a fingerprint sensor and a force sensor are stacked, as shown in FIG. 3 in accordance with an embodiment of the present invention. FIG. 3 shows a configuration in which the force sensor 200 and the fingerprint sensor 100 are arranged in the direction of an arrow indicated by 99. The force sensors 200 are formed of a plurality of force electrodes.

Sections 1 to 5 in FIG. 8 are indicated for identifying a plurality of force electrodes included in the force sensor 200. Configurations 81a, 81b, 82a, 82b, 83a and 83b are the configurations in which five force electrodes, e.g., the force sensors are arranged, and 84a and 84b are the configurations in which nine force electrodes, e.g., the force sensors are arranged. Of course, the plurality of force electrodes can be arranged in each area indicated by numbers 1 to 9, and they can be collectively referred to as a force sensor.

In addition, configurations 81a, 82a, 83a, and 84a are the configurations in which each force electrode is arranged adjacent to each other, and configurations 81b, 82b, 83b, and 84b are the configurations in which each force electrode is arranged spaced apart from each other.

Figure 9:
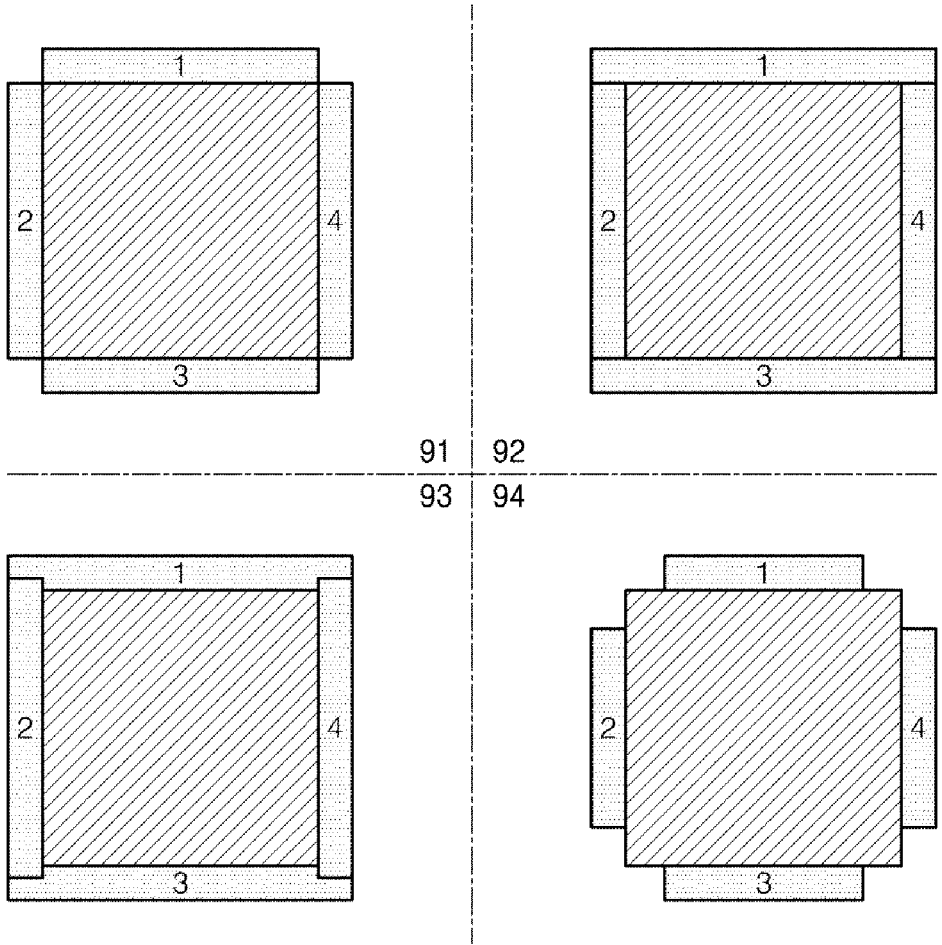
FIG. 9 is a view illustrating an embodiment in which a force sensor can be formed in a structure in which a fingerprint sensor and a force sensor are formed on the same layer as shown in FIG. 4 in accordance with another embodiment of the present invention.

FIG. 9 is a view illustrating an embodiment in which a force sensor can be formed in a structure in which a fingerprint sensor and a force sensor are formed on the same layer, as shown in FIG. 4 in accordance with another embodiment of the present invention. FIG. 4 shows a configuration in which the force sensor 200 and the fingerprint sensor 100 are arranged in an arrow direction indicated by 99.

Sections 1 to 4 are indicated to identify parts of the force sensor 200. Configurations 91, 92, 93 and 94 show that four force electrodes are included in a force sensor and are arranged on a periphery of the fingerprint sensor 100. Configuration 91 is a configuration in which the force electros are included in the force sensor 200 are not arranged in an edge part (e.g., corner part). Configuration 92 is a configuration in which the force electrodes included in the force sensor 200 are arranged to an edge part (e.g., around all the edges and corners). Configuration 93 is a configuration in which the force electrodes included in the force sensor are arranged with overlapped portions. Configuration 94 is a configuration in which the force electrodes included in the force sensor are arranged in some part of a straight line part of the fingerprint sensor 100 (e.g., not around or near the corners).

When the finger is contacted to the fingerprint input area 11a to recognize the fingerprint from outside, the force is applied or driven to the force electrodes included in the ambient force sensor by the contact of the finger and each force electrode can implement the fingerprint recognition corresponding to the force input.

As shown in FIGS. 8 and 9, multiple force sensors can be formed on an area in which a fingerprint is input, e.g., on a rear surface or a periphery of the fingerprint sensor, thereby making it possible to determine a directionality according to a user input. For example, it is possible to confirm whether a force is applied or driven by the fingerprint input by using a time difference which the force is applied to the force sensor or the force is applied or driven in a process of passing through the fingerprint input area.

As described in the above-mentioned embodiments, the fingerprint sensing processor 70 capable of controlling the force sensor and controlling the driving of the force sensor can detect the user's input using the force sensor 200. In addition, the sensors 200 can detect the directionality of the force calculated according to the time of sensing the force and the positions of the force sensors 200. The position and the directionality of such sensed force can select whether the fingerprint sensing processor 70 starts the fingerprint sensing or confirms a touch other than a fingerprint sensing and does not start the fingerprint sensing, which increases the accuracy of the fingerprint sensing.

In addition, the fingerprint sensing processor 70 transmits information, such as the directionality or the position of the sensed force, to the application processor 50 so that the application processor 50 provides an UI to directly execute the specific application which a user designates in a display environment in the AOD mode, making possible to improvement the UI. In an embodiment of the present invention, when the application processor 50 maintains the display in a sleep state, when the finger, etc. is contacted on an area for a fingerprint input indicated by the AOD mode, the force sensor senses the force. As a result, the fingerprint sensing processor 70 obtains fingerprint input information and transmits it to the application processor 50. The application processor 50 can suspend the sleep state of the display according to received fingerprint input information and execute the application corresponding to fingerprint input information.

In FIGS. 8 and 9, the fingerprint sensing processor 70 can generate force input information which is information that the force sensor senses including information of a direction which the force is input by using the force sensors having various sections. For example, in a state in which the force sensor indicated by "1" in configuration 81*a* or configuration 81*b* of FIG. 8 senses a force, with regard to the state in which the force sensor indicated by "2" senses a force, the fingerprint sensing processor 70 can confirm that a center and an upper direction of the fingerprint sensor are pressed and activates the fingerprint sensor 10, thereby making the fingerprint sensing possible.

In addition, the fingerprint sensing processor 70 can generate force input information, which is information sensed by the force sensor, including information on the direction in which the force is input, and transmit it to the application processor 50 together with fingerprint input information. In this instance, the application processor 50 can execute the corresponding application based on force input information and fingerprint input information which the upper direction is pressed.

In a state in which the force sensor indicated by "2" senses the force in a state in which the force sensor indicated by "1" in configuration 81*a* or configuration 81*b* of FIG. 8 does not sense the force, the fingerprint sensing processor 70 can confirm that only the upper part of the fingerprint sensor is pressed and make the fingerprint sensor 100 not be activated.

That is, the fingerprint sensing processor 70 confirms whether to sense the fingerprint by driving the fingerprint sensor based on force input information which is calculated by the sensed forces by the force senses arranged on the periphery or the rear surface of the fingerprint sensor. In addition, the fingerprint sensing processor 70 can transmit force input information and fingerprint input information obtained through the fingerprint sensor to the application processor 50 such that the particular application is operated in response to the fingerprint input (e.g., the user can use the direction to select a specific application).

Figure 10:
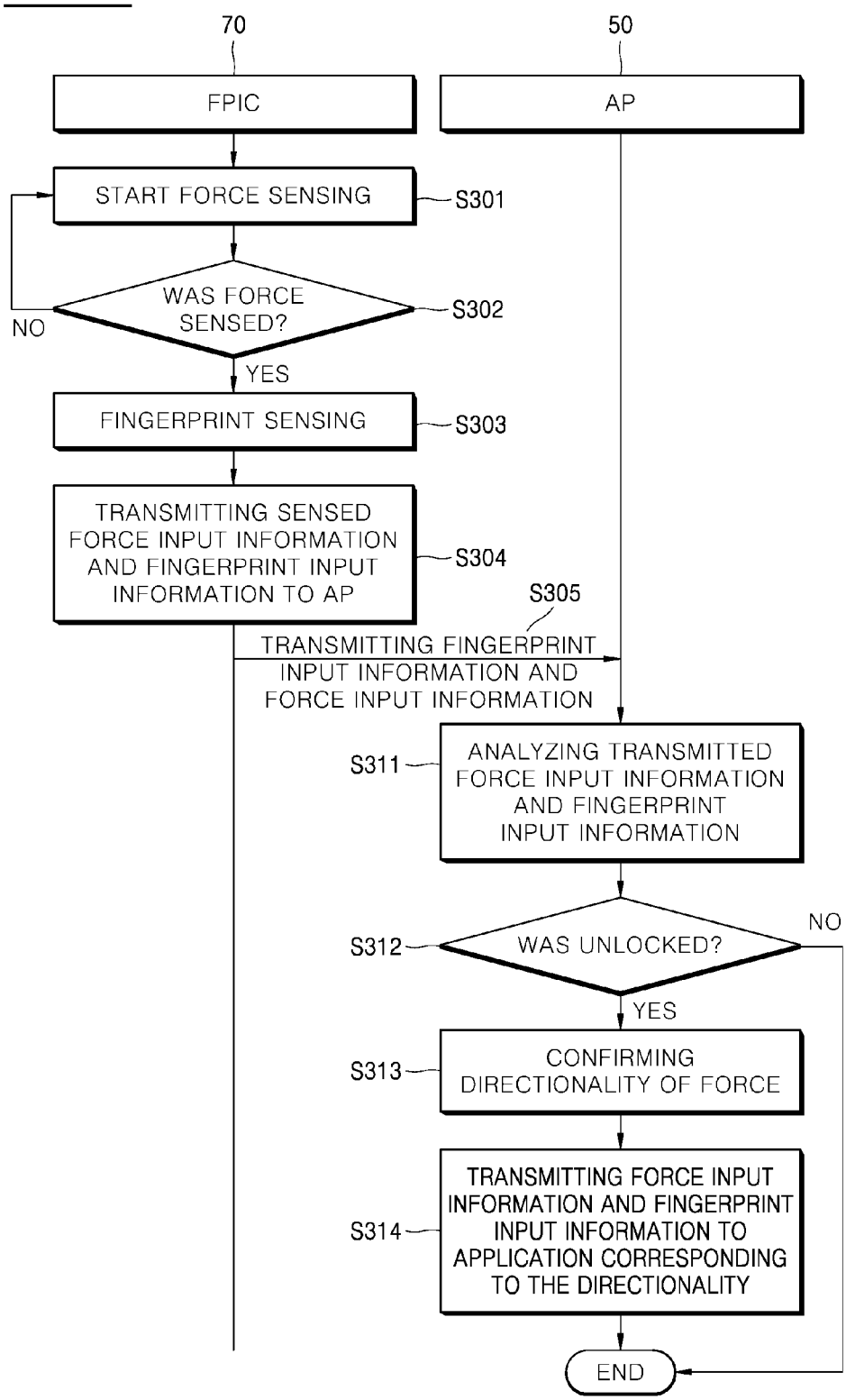
FIG. 10 is a view illustrating a process of determining a condition for fingerprint recognition in accordance with an embodiment of the present invention.

FIG. 10 is a view illustrating a process of determining a condition of fingerprint recognition in accordance with to an embodiment of the present invention. A fingerprint sensing processor 70 controls a force sensor 200 and a fingerprint sensor 100. The force sensor 200 starts force sensing (S301), and confirms whether the force is sensed (S302). If it is not sensed, it proceeds to step S301 which starts a force sensing again.

Further, when a force is sensed (S302), it is determined that a condition of a fingerprint input is satisfied and the fingerprint sensor 100 senses the fingerprint (S303). An embodiment of the present invention is that the fingerprint sensing processor 70 confirms that the force sensor 200 senses the force and drives a fingerprint sensing of the fingerprint sensor 100. In addition, the fingerprint sensing processor 70 generates fingerprint data sensed by the fingerprint sensor 100 and force data sensed in (S302) previously described to fingerprint input information and force input information to transmit it to the application processor 50 (S304).

The fingerprint sensing processor 70 transmits fingerprint input information and force input information described above to the application processor 50 (S305). An embodiment of the present invention can be an event to wake up (Event of Wakeup) the application processor 50. For example, when the fingerprint input is received in an Always On Display (AOD) mode, the application processor 50 can be in a sleep state actually or a state which cannot currently process at least fingerprint data. In this state, the fingerprint sensor processor 70 transmits fingerprint input information, force input information, and the event, and thus, the application processor 50 can be woken up and placed into a state for processing fingerprint input information.

As a result, the application processor 50 analyzes transmitted data, that is, transmitted fingerprint input information and force input information (S311). Prior to S311, the application processor 50 can maintain in a sleep state. Step S311 shows a process that the application suspends the sleep state and proceeds. This can reduce the amount of power consumed by the application processor 50 since the application processor 50 maintains a state in which it does not perform any operation for separate fingerprint processing as a result of maintaining the sleep state. When it is unlocked by the fingerprint according to an analysis result (S312), a directionality of the force is confirmed in force input information (S313). This means that it is possible to select the application to process fingerprint data. That is, fingerprint input information and force input information can be combined to execute a specific application or transfer data to the application (S314).

On the contrary, when it is not in an unlocked state in S312, that is, it is not authenticated as a result of the fingerprint recognition, or a situation which cannot perform an operation corresponding to the fingerprint recognition, the process ends.

Figure 11:
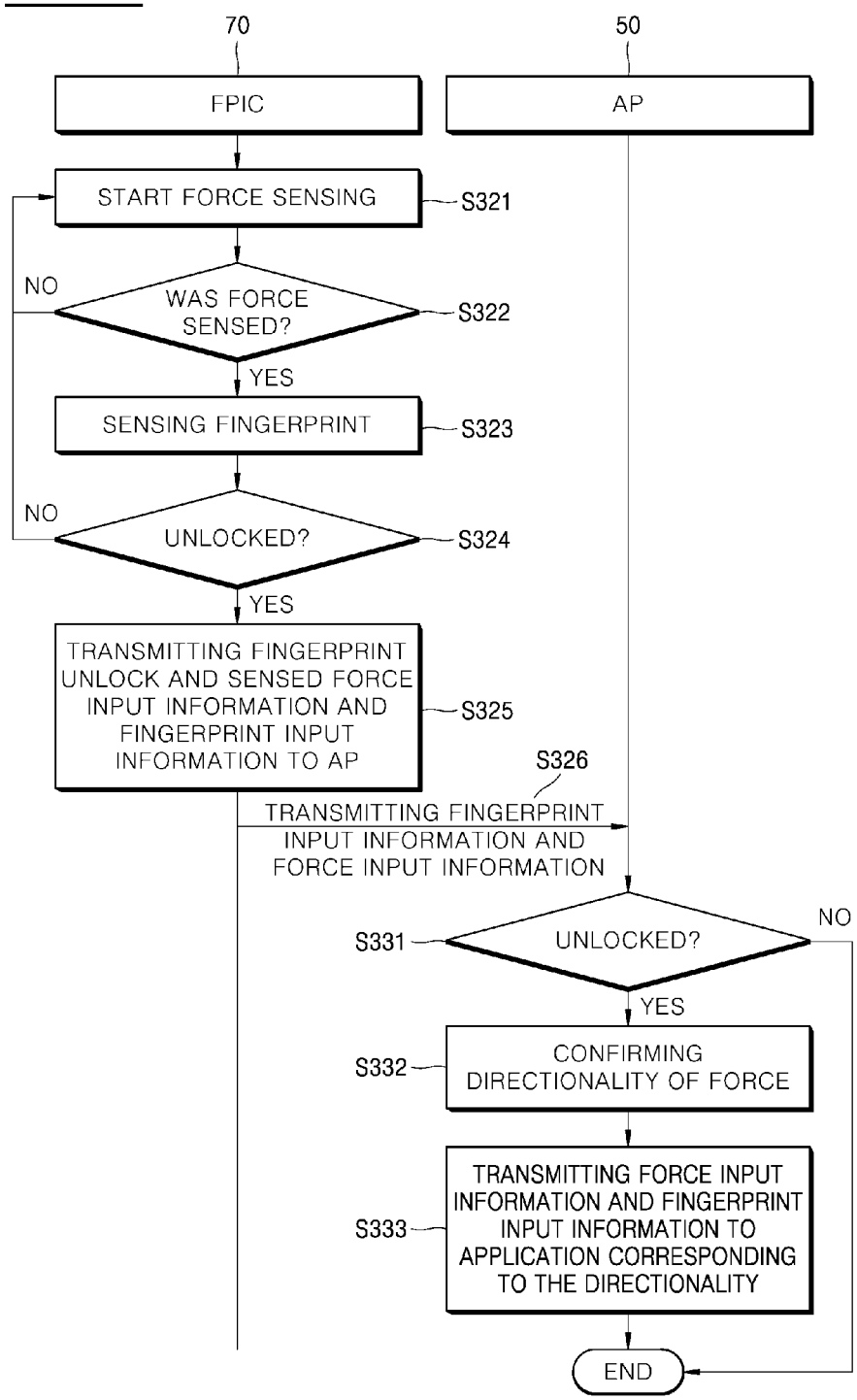
FIG. 11 is a view illustrating a process of determining a condition for fingerprint recognition in accordance with another embodiment of the present invention.

FIG. 11 is a view illustrating a process of determining a condition of fingerprint recognition in accordance with another embodiment of the present invention. A fingerprint sensing processor 70 controls a force sensor 200 and a fingerprint sensor 100. The force sensor 200 starts a force sensing (S321), and confirms whether a force is sensed (S322). If it is not sensed, it proceeds to step S321 to start the force sensing again.

On the contrary, when the force is sensed (S322), it is determined that a condition of a fingerprint input is satisfied and the fingerprint sensor 100 senses a fingerprint (S323). An embodiment of the present invention is that the fingerprint sensing processor 70 confirms that the force sensor 200 senses the force and drives a fingerprint sensing of the fingerprint sensor 100. As a result of the fingerprint sensing (S323), it has to be confirmed whether it is unlocked or not (S324). An embodiment of the present invention is to confirm that a locked state is released by a sensed fingerprint.

When it is unlocked, the fingerprint sensing processor 70 transmits information on the fingerprint unlock, fingerprint input information in which the fingerprint sensor 100 senses and produces, and force input information which is sensed in S322 previously and the fingerprint sensing processor 70 produces to an application processor 50 (S325). The fingerprint sensing processor 70 transmits fingerprint input information, and force input information, and an event to the application processor 50 (S326), and in accordance with an embodiment of the present invention, an event to wake up (Event of Wakeup) the application processor 50 can be included.

For example, when the fingerprint input is received in the Always On Display (AOD) mode, the application processor 50 can be in a sleep state or in a state which cannot process at least fingerprint input information. In this state, the fingerprint sensing processor 70 transmits fingerprint input information, force input information, and the event so that application processor 50 can convert input fingerprint input information into a state for processing.

As a result, the application processor 50 confirms an unlock state based on transmitted data, that is, transmitted fingerprint input information and force input information (S331). When it is unlocked by the fingerprint as a result of a confirmation (S332), a directionality of the force in force input information is confirmed (333). This means that the application to process fingerprint input information can be selected. That is, fingerprint input information and force input information can be combined to execute a specific application or transfer data to the application (S333).

On the contrary, when it is not in an unlocked state in (S331), that is, it is not authenticated as a result of the fingerprint recognition or in a situation in which an operation corresponding to the fingerprint recognition cannot be performed, the process ends.

Describing FIGS. 10 and 11, since the fingerprint sensing processor 70 can confirm the determination about the user's fingerprint input using the force sensing, it is possible to perform the fingerprint input faster than processing it in the application processor 50. In particular, in the situation of a display to implement the AOD mode, a position for fingerprint input can be displayed on a display panel. The fingerprint sensor can be arranged on a rear surface of the display panel corresponding to such position, and the force sensor arranged in a periphery of the fingerprint sensor allows the display panel confirm whether the fingerprint recognition is performed or not through a force input without using a touch input signal by the display panel.

As shown in FIGS. 10 and 11, the application processor 50 can execute the application corresponding to receive force input information and fingerprint input information.

For example, in FIGS. 8 and 9, one or more force sensors arranged on a side surface or a rear surface of the fingerprint sensor 100 can sense the force differently depending on a point to which the user touches.

Thus, force input information collected and produced in the differently sensed forces can correspond to which application is to be selected and executed. In an embodiment of the present invention, the application processor 50 can drive an application called application "A" when the fingerprint is sensed as swapping including the side surface of the fingerprint sensor. On the contrary, the application processor 50 can drive an application called application "B" when it is sensed in a middle of the fingerprint sensor.

In addition, the application processor 50 can execute the application corresponding to the received fingerprint input information, except for force input information. Applying force input information to an application execution by the application processor 50 can be determined variously in accordance with implementing embodiment and the application processor 50 allows the driving of the application by corresponding the single application and the fingerprint input state.

An operation and a fingerprint recognition process of the force sensor and the fingerprint sensor will be described in detail.

Figure 12:
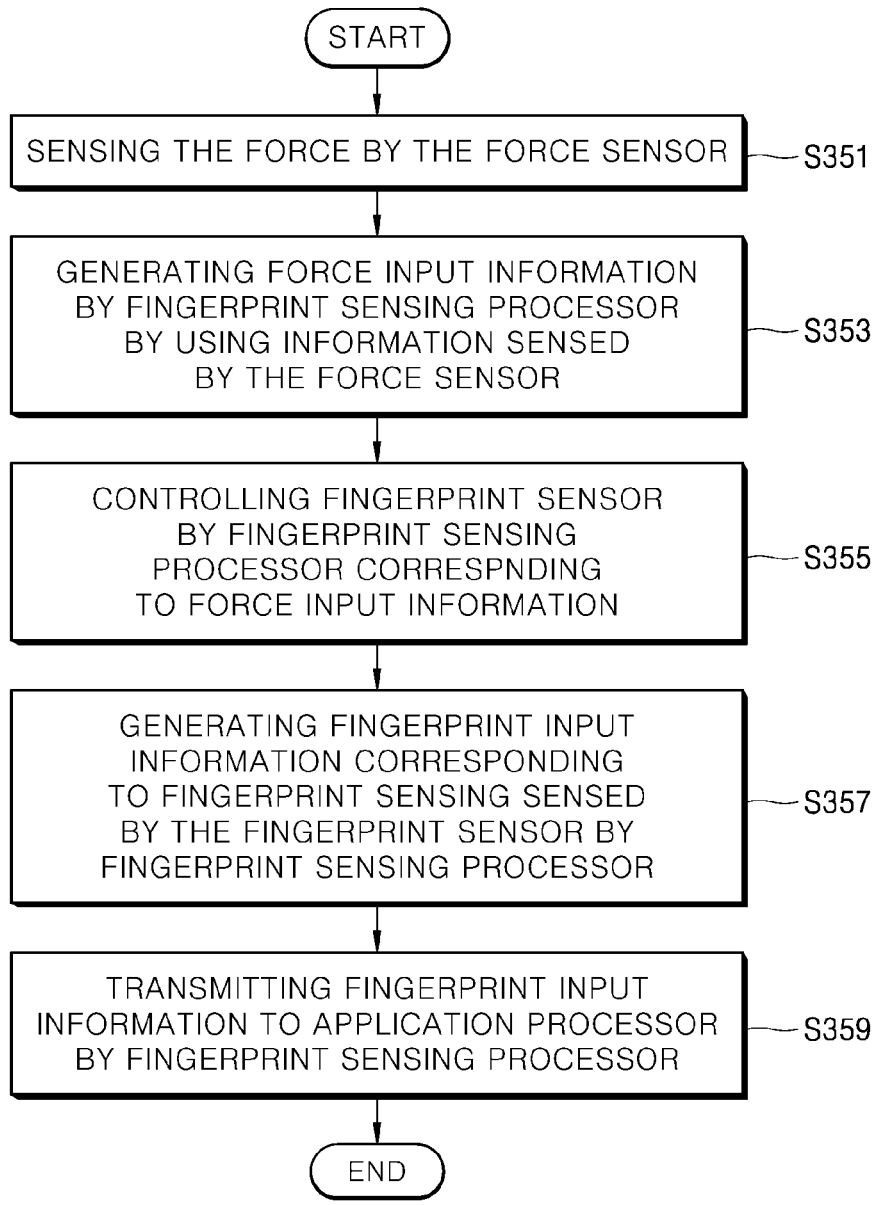
FIG. 12 is a view illustrating a process in which a display drives in accordance with an embodiment of the present invention.

FIG. 12 is a view illustrating a process of driving a display in accordance with an embodiment of the present invention. A force sensor 200 senses a force (S351). As a result, a fingerprint sensing processor 70 generates force input information using information sensed by the force sensor 200 (S353). In addition, in response to force input information, the fingerprint sensing processor 70 controls the fingerprint sensor 100 (S355). More specifically, when the fingerprint sensing processor 70 analyzes force input information and it is confirmed that a user performs an input to a fingerprint sensor 100, it proceeds to S357 to produce fingerprint input information.

That is, the fingerprint sensing processor 70 generates fingerprint input information corresponding a fingerprint sensing sensed by the fingerprint sensor 100 (S357). Then, the fingerprint sensing processor 70 transmits fingerprint input information to the application processor 50 to control an application of the display 10 (S359) such that the application processor 50 drives the application by using fingerprint input information. In other words, since the application processor 50 operates the application using already processed fingerprint input information (e.g., processed by the fingerprint sensing processor 70), it is possible to reduce a time required for the fingerprint input and reduce an operation load of the application processor 50. Also, in this process, the fingerprint sensing processor 70 can unlock the display 10 based on fingerprint input information, which is illustrated in FIG. 11. Here, prior to step S359, the step in which the application processor 50 controls the display to maintain in a sleep state can be preceded. In addition, in a situation in which a finger, etc. is contacted on an area for the fingerprint input, which is displayed by an AOD mode, when the force sensor detects the force, and accordingly, the fingerprint sensing processor 70 obtains fingerprint input information and transmits it to the application processor 50 (S359), the application processor 50 then can suspend the sleep state of the display according to received fingerprint input information and execute the application corresponding to fingerprint input information. In addition, prior to step S351, the application processor of the display can apply an image signal to the display panel such that the position in which the fingerprint sensor is arranged in the image display area of the display panel is displayed.

Figure 13:
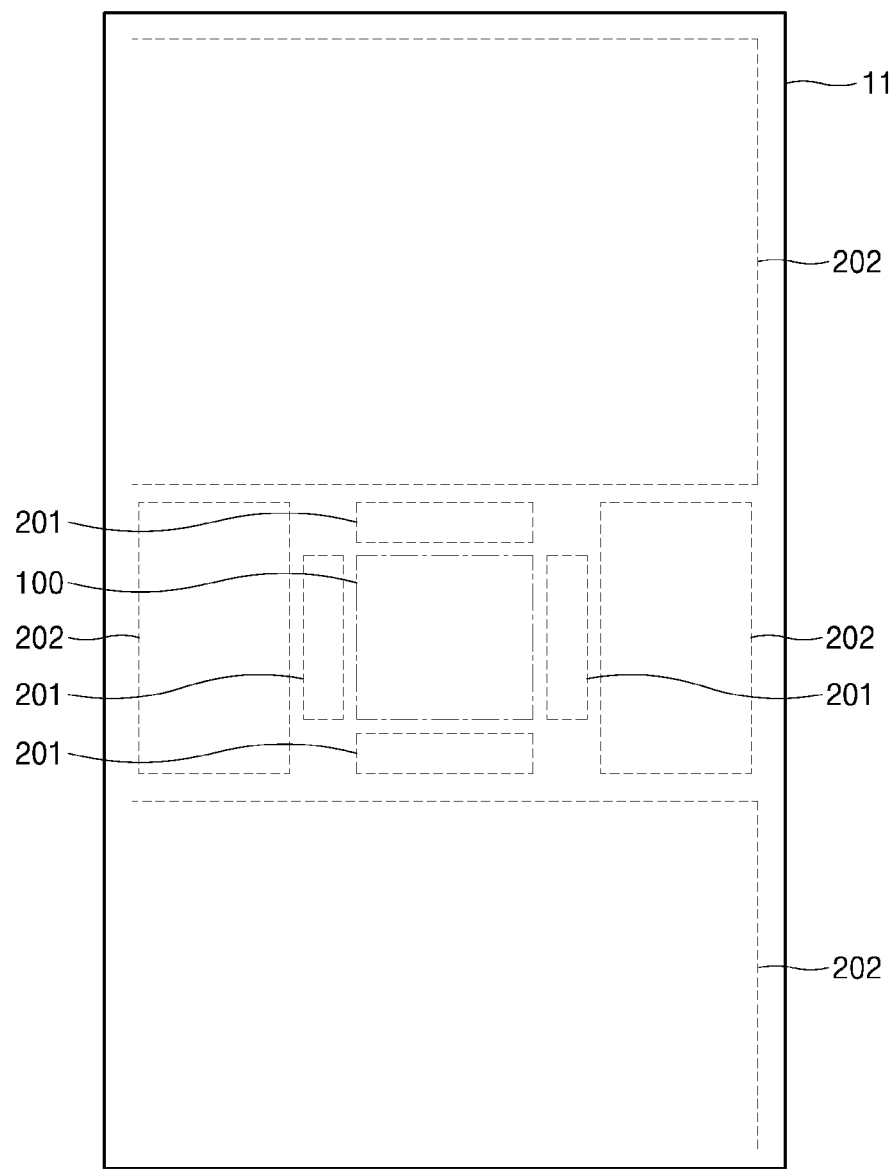
FIG. 13 is a view in which a force sensor is arranged at a position spaced apart from a fingerprint sensor in accordance with an embodiment of the present invention.

FIG. 13 is a view showing a plurality of force electrodes arranged at a position spaced apart from a fingerprint sensor in accordance with an embodiment of the present invention. The force sensor is formed of one or more force electrodes. A position where the force sensor is arranged on a display panel 11 is displayed. The fingerprint sensor 100 is arranged at the center of the display panel 11. As shown in FIGS. 3 and 4, the first force electrodes are arranged along the periphery of the fingerprint sensor 100 or on the rear surface of the fingerprint sensor 100. In FIG. 13, the first force electrode 201 is arranged on the periphery of the fingerprint sensor 100.

In addition, the second force electrodes 202 are arranged at a position spaced apart from the fingerprint sensor 100. A second force electrode 202 is a force electrode that senses a force in response to a touch irrespective of a fingerprint input. Accordingly, when the first force sensor 201 senses the force input, the fingerprint sensing processor 70 lowers a force sensing sensitivity of the second force electrode 200 so that the fingerprint can be sensed more accurately. In FIG. 13, an embodiment of the present invention is that the force sensor is formed of the plurality of force electrodes and some of these force electrodes are disposed on the periphery or the rear surface of the fingerprint sensor 100 and the other force electrodes are arranged at a position spaced apart from the fingerprint sensor 100. In this instance, a sensing sensitivity of the force electrodes spaced apart from the fingerprint sensor 100 can be lowered in order to increase a sensing sensitivity of the force electrodes adjacent to the fingerprint sensor 100, in order to make the force sensing precisely in the position of the fingerprint sensor 100 (e.g., force sensing can be focused around the fingerprint sensor).

When implementing the embodiments as described above, it is possible to implement a fingerprint sensing processor 70 which is possible to drive the force, that is, an integrated processor (IC) to control both the fingerprint sensor and the force sensor which can control the application designated by the user in the AOD mode when the fingerprint is input by using the fingerprint sensor which is possible to detect the user input and the force sensor which is possible to detect a directionality. In particular, it is possible to drive different applications depending on the directionality detected by the force sensor even if it is the same fingerprint input.

Table 1 shows that an application executable in the configurations of 81*a*, 81*b*, 82*a*, 82*b*, 83*a*, and 83*b* of FIG. 8 are set differently according to a directionality of the force input information.

TABLE 1

| Force input information | Executed application |
|---|---|
| 1 to 2 | App_1 |
| 1 to 3 | App_2 |
| 1 to 4 | App_3 |
| 1 to 5 | App_4 |
| 4 to 1 to 5 | App_5 |

Table 1 shows that App_1 is executed when a direction of a force detected by the force sensors changes from 1 to 2 (1 to 2). For example, in Table 1, "1 to 2" means a directionality biased upwards from the center in the embodiment of 81*a*, 81*b*, 82*a*, 82*b*, 83*a*, and 83*b* configurations. In addition, based on FIG. 8, "1 to 3", "1 to 4", and "1 to 5" mean executing each application (App_2, App_3, App_4) when the direction of the force is 1 to 3, or 1 to 4, or 1 to 5.

Further in this example, direction information of "4 to 1 to 5" indicates an application (App_5) is to be executed when the user performs the fingerprint input rubbing from left to right (from 4 force sensor to 5 force sensor direction). Information in Table 1 can be stored in the application processor 50.

Figure 14:
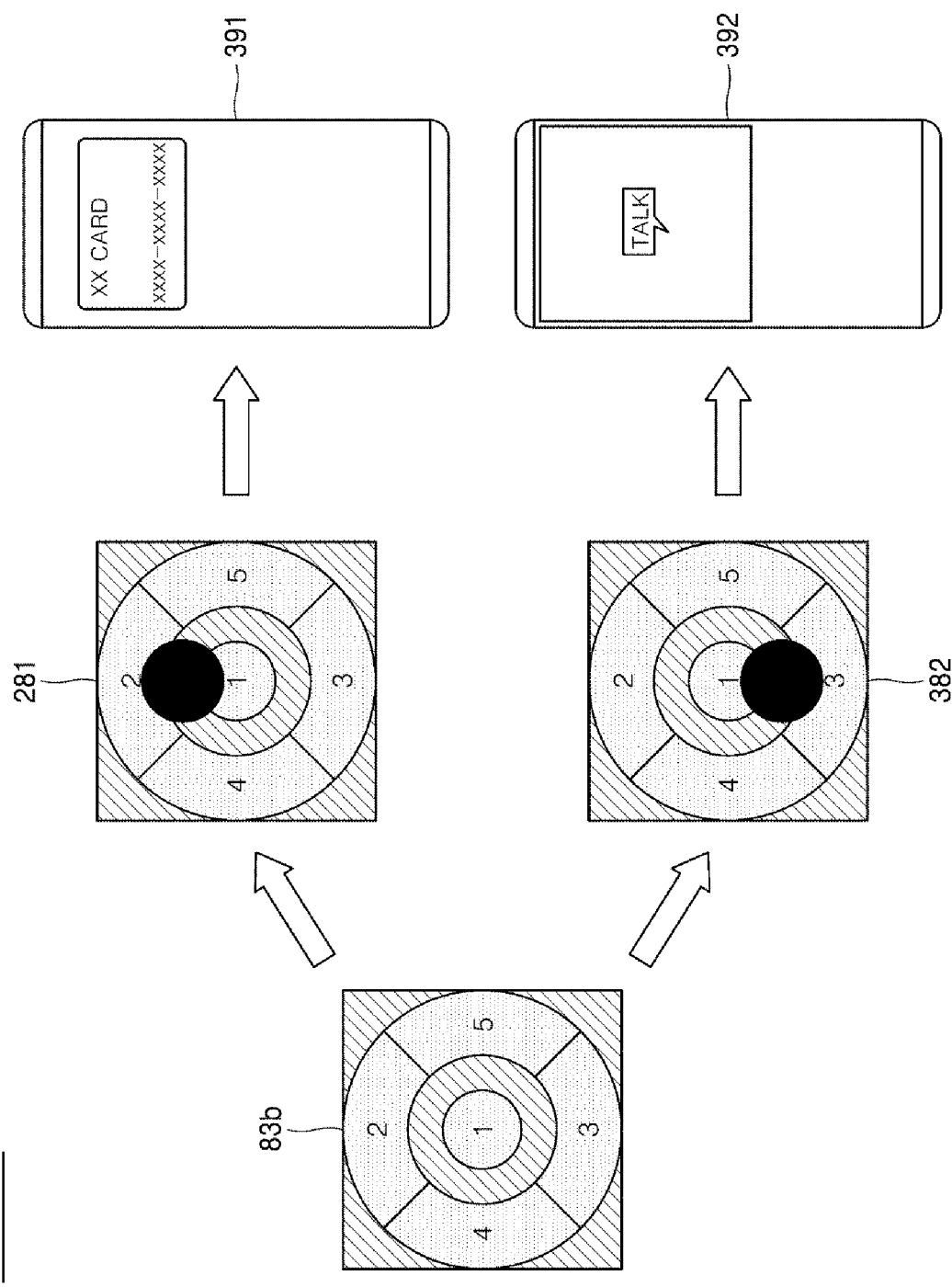
FIG. 14 is a view illustrating a situation where a different application is executed based on directionality according to a fingerprint input in accordance with an embodiment of the present invention.

FIG. 14 is a view illustrating a situation where a different application is executed according to a fingerprint input in accordance with an embodiment of the present invention.

In accordance with an embodiment of the present invention, the force sensors are arranged in the same structure as configuration 83*b* of FIG. 8. When "1" and "2" force sensors sense the force such as 281 in 83*b*, the application processor 50 executes App_1 through the fingerprint sensing as in 391. In an embodiment of the present invention, a card payment application is executed. Also, when "1" and "3" force sensors sense the force as in 382 in 83*b*, the application processor 50 executes App_2 through the fingerprint sensing as in 392. In an embodiment of the present invention, a messenger application is executed.

Table 2 shows that the applications that can be executed in the 91, 92, 93, and 94 configurations of FIG. 9 are set differently according to the force sensed by the force sensor.

TABLE 2

| Force input information | Executed application |
|---|---|
| Only 1 | App_1 |
| Only 2 | App_2 |
| Only 3 | App_3 |
| Only 4 | App_4 |
| 1 & 2 | App_5 |

Table 2 shows App_1 is executed when only 1 force sensor detects the force (Only 1). "Only 1" means that the force is input biased upwards based on the fingerprint sensor in the embodiments of 91, 92, 93, and 94 configurations of FIG. 9. In addition to that, "Only 2", "Only 3", and "Only 4" mean the force sensors which detect the force based on FIG. 9, and when the particular force sensor senses the force, it means executing each application (App_2, App_3, App_4).

For example, information for force sensors "1 & 2" instruct the application (App_5) to be executed in response to the situation in which the fingerprint input is performed biased to the left and upper part (1 force sensor and 2 force sensor) by the user. Information in Table 2 can be stored in the application processor 50.

As shown in Tables 1 and 2, in driving a specific application by using the directionality or the position of a force sensed by the force sensor, it is possible to prevent an unnecessary page from being accessed and to reduce the user's input, thereby increasing user convenience. In addition, since the fingerprint sensing processor 70 can determine whether the fingerprint sensing is performed or not by using a force sensor other than the touch panel, the power consumption can be improved.

When the embodiments of the present invention are applied, it is possible to realize the device and the method for improving the speed or the accuracy of the fingerprint sensing on the display panel. In addition, the embodiments of the present invention are applied, it is possible to realize the device and the method of reducing the amount of power consumption in the fingerprint sensing process to improve battery performance.

While the embodiments of the present invention have been mainly described in the above, various changes or modifications can be made at a level of those skilled in the art. Therefore, it will be understood that such changes and modifications are included within the scope of the present invention unless these changes and modifications do not deviate therefrom.

What is claimed is:

1. A display device, comprising:
    a display panel configured to display an image;
    a fingerprint sensor disposed on a rear surface corresponding to an image display area of the display panel;
    one or more force sensors disposed at a periphery of the fingerprint sensor or on a rear surface of the fingerprint sensor;
    a first processor configured to:
        control the fingerprint sensor and the one or more force sensors, and
            in response to the one or more force sensors sensing a force transmitted through an upper side of the display panel, activate fingerprint sensing of the fingerprint sensor; and
    a second processor configured to control an application and transmit an image signal to the display panel to display an object at an area in the image display area corresponding to a position of the fingerprint sensor,
    wherein the first processor is further configured to generate fingerprint input information corresponding to the fingerprint sensing of the fingerprint sensor and transmit the fingerprint input information to the second processor.

2. The display device of claim 1, wherein the first processor is further configured to:
    generate force input information corresponding to information sensed by the one or more force sensors, wherein the force input information includes information on a direction in which the force is input.

3. The display device of claim 2, wherein the first processor is further configured to:
    transmit the fingerprint input information and the force input information sensed by the one or more force sensors to the second processor.

4. The display device of claim 3, wherein the second processor is further configured to:
    select a specific application corresponding to the force input information and the fingerprint input information, and
    execute the specific application.

5. The display device of claim 4, wherein the second processor is further configured to:
    maintain the display panel in a sleep state, and
    suspend the sleep state of the display panel according to the fingerprint input information.

6. The display device of claim 1, wherein the second processor is further configured to:
    execute a specific application corresponding to the fingerprint input information.

7. The display device of claim 1, wherein the fingerprint sensor is disposed on a rear surface of the display panel,
    wherein the one or more force sensors are disposed on the rear surface of the fingerprint sensor, and
    wherein the first processor controls the fingerprint sensor according to a direction of the force sensed by the one or more force sensors or a position of the one or more force sensors corresponding to a force applied to an upper surface of the fingerprint sensor.

8. The display device of claim 1, wherein the fingerprint sensor and the one or more force sensors are disposed on a rear surface of the display panel,
    wherein at least one of the one or more force sensors is disposed on a side surface of the fingerprint sensor, and
    wherein the first processor controls the fingerprint sensor according to a direction of the force sensed by the one or more force sensors or a position of the at least one of the one or more force sensors corresponding to the force applied to the upper surface of the display panel.

9. The display device of claim 1, wherein the one or more force sensors include:
    one or more first force electrodes disposed at the periphery of the fingerprint sensor or on the rear surface of the fingerprint sensor; and
    one or more second force electrodes disposed at a position spaced apart from the fingerprint sensor, and
    wherein a force sensing sensitivity of the second force electrode is lowered when the one or more first force electrodes sense a force input.

10. A method for driving a display device having a display panel, a force sensor and a fingerprint sensor, the method comprising:
    transmitting, via an second processor of the display device, an image signal to the display panel and displaying an object at area in an image display area of the display panel corresponding to a position of the fingerprint sensor;
    generating force input information based on information sensed by the force sensor which is arranged adjacent to the fingerprint sensor disposed on a rear surface corresponding to the image display area of the display panel;
    in response to a first processor receiving the force input information, activing fingerprint sensing of the fingerprint sensor;
    generating, via the first processor, fingerprint input information corresponding to the fingerprint sensing sensed by the fingerprint sensor; and
    transmitting, via the first processor, the fingerprint input information to the second processor.

11. The method of claim 10, wherein the force input information includes information on a direction in which a force is input.

12. The method of claim 11, further comprising:
    transmitting, via the first processor, the force input information and the fingerprint input information to the second processor.

13. The method of claim 12, further comprising:
    selecting, via the second processor, a specific application corresponding to the force input information and the fingerprint input information; and
    executing, via the second processor, the specific application.

14. The method of claim 13, further comprising:
    maintaining, via the second processor, the display panel in a sleep state; and
    suspending, via the second processor, the sleep state of the display panel according to the fingerprint input information.

15. The method of claim 10, further comprising:
    executing, via the second processor, a specific application corresponding to the fingerprint input information.

16. The method of claim 10, wherein the fingerprint sensor is disposed on a rear surface of the display panel,
    wherein the force sensor is disposed on a rear surface of the fingerprint sensor, and wherein the method further comprises controlling, via the first processor, the fingerprint sensor according to a direction of a force sensed by the force sensor or a position of the force sensor corresponding to the force applied on an upper surface of the fingerprint sensor.

17. The method of claim 10, wherein the fingerprint sensor and the force sensor are disposed on a rear surface of the display panel, wherein the force sensor is disposed on a side surface of the fingerprint sensor, and wherein the method further comprises controlling, via the first processor, the fingerprint sensor according to a direction of a force sensed by the force sensor or a position of the force sensor corresponding to the force applied on an upper surface of the display panel.

18. The method of claim 10, wherein the force sensor comprises:

one or more first force electrodes disposed at a periphery of the fingerprint sensor or on a rear surface of the fingerprint sensor; and one or more second force electrodes disposed at a position spaced apart from the fingerprint sensor, and wherein the method further comprises lowering a force sensing sensitivity of the second force electrode, via the first processor, when the first force electrode senses a force input.

* * * * *